UNITED STATES PATENT OFFICE 2,671,802

ALPHA-SUBSTITUTED, HYDROXY HALOGEN-SUBSTITUTED CINNAMIC ACIDS AND NONTOXIC SALTS

Domenick Papa, Brooklyn, N. Y., and Erwin Schwenk, Montclair, N. J., assignors, by mesne assignments, to Schering International Research Institute, Bloomfield, N. J., a corporation of New Jersey No Drawing. Application April 9, 1948,
Serial No. 20,107

12 Claims. (Cl. 260—520)

This invention relates to new halogen aryl aliphatic carboxylic acids and their salts characterized by their high amebicidal and bactericidal properties and by their low toxicity on oral administration and to methods of making the same.

A principal object of the invention is the provision of compounds of amebicidal and bactericidal properties and low toxicity.

The new compounds of the invention may be represented by the general formula

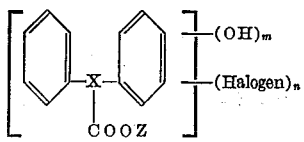

wherein X is an unsaturated aliphatic radical containing at most three carbon atoms, $m$ is an integer not less than 1 and not greater than 2, $n$ is an integer not less than 1 and not greater than 4, the hydroxyl and halogen being directly attached to a benzene ring and at least one halogen atom being on the same ring with each hydroxyl group, and Z is a positive radical. The hydroxyl groups may be replaced by amino groups.

The compounds of the invention may be produced in the manner generally followed for the Perkin and modified Perkin reactions. Thus, an alkali metal salt of an aliphatic or aryl aliphatic carboxylic acid may be heated with an aryl aldehyde in the presence of an organic dehydrating agent like acetic, propionic, butyric and valeric anhydride until condensation has taken place, after which the aryl or diaryl carboxylic acid is isolated, as in the form of the sodium salt, and the free acid is precipitated by acidification of a solution of the salt. Alternatively, the aryl aldehyde can be reacted with an ester, such as the methyl or ethyl ester, of the aliphatic or aryl aliphatic acid in the presence of an alkali metal alkoxide, like sodium ethoxide, followed, if desired, by hydrolysis. The compounds of the invention may also be made by reacting the aryl aldehydes with the free aliphatic or aryl aliphatic carboxylic acid in an organic dehydrating agent in the presence of a molar equivalent of a suitable catalyst such as an alkali metal salt of a weak acid, for example, potassium acetate, or a basic organic nitrogen compound, for example, triethylamine.

The acid reaction products can be converted into the metal salts and especially the sodium salt, or into amine salts such as those of dialkyl-aminoethanol, like diethylaminoethanol, and of ethanolamine, triethanolamine and other alkanolamines.

The preferred starting materials for producing the compounds of the invention are substituted and unsubstituted benzaldehyde and cinnamaldehyde, on the one hand, and the substituted and unsubstituted alkane carboxylic acids, on the other, the alkane carboxylic acid having at least two carbon atoms, and the invention will be further described in the following examples with the employment of these compounds as starting materials.

EXAMPLE 1

*α-(p-Iodophenyl)-3,5-diiodo-4-hydroxycinnamic acid*

A mixture of 15 g. of potassium p-iodophenylacetate and 18.7 g. of 3,5-diiodo-4-hydroxybenzaldehyde and 100 cc. of acetic anhydride is heated for approximately six to eight hours at 100–110° C. The reaction mixture is then cooled to 70° and the excess acetic anhydride decomposed by the cautious addition of water. The crystalline residue is dissolved in a large volume of ether and washed free of acetic acid with water. The ether solution is evaporated and the residue treated with dilute sodium hydroxide. The alkaline solution is heated, treated with decolorizing carbon, filtered and acidified with concentrated HCl. The precipitated triiodo hydroxy acid is filtered and is obtained in a yield of 16 g., melting at 230–231°. Recrystallized from acetone and water the compound is obtained as a pale yellow crystalline material melting at 246–248° (corr.). Its formula is

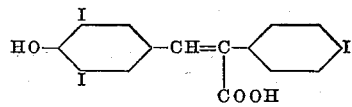

EXAMPLE 2

*α-Benzyl-3,5-diiodo-4-hydroxycinnamic acid*

Heat at 110° C. for 80 hours a mixture of 18.7 g. of 3,5-diiodo-4-hydroxybenzaldehyde, 9.4 g. of potassium-β-phenylpropionate and 100 cc. of acetic anhydride. The excess anhydride is then decomposed with water and the compound is isolated as described in Example 1. The crude yield of 16 g. which is obtained melts at 233–234°. Recrystallized from a mixture of acetone and water the diiodo acid melts at about 240-241° with decomposition. It has the formula

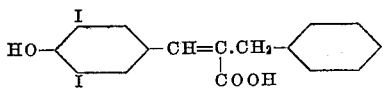

EXAMPLE 3

*α-(Phenyl)-3,5-diiodo-4-hydroxycinnamic acid*

6.7 g. 3,5-diiodo-4-hydroxybenzaldehyde, 2.6 g. potassium phenylacetate and 50 cc. acetic anhydride are heated for 6 hours at 105-110° C. The excess acetic anhydride is decomposed with water and the resulting solution poured into dilute hydrochloric acid. The crystalline product is stirred for 3 hours with 10% sodium hydroxide, acidified and filtered. The precipitate is dissolved in sodium carbonate solution, heated, mixed with an equal volume of a hot saturated sodium chloride solution and immediately filtered. On cooling the sodium salt precipitates out. It is filtered, dissolved in water, filtered to remove insoluble impurities and acidified. The acid thus obtained is recrystallized from acetone, M. P. 222-225°.

A further recrystallization from acetone-water, using carbon, yields pale yellow needles. M. P. 228.5° (corr.). Recrystallization from benzene gives fine white needles melting at 230-231°. The compound has the formula

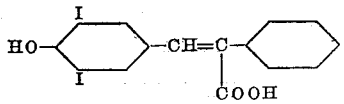

The compound of this example may also be made by the following procedure:

A mixture of 37.4 g. of 3,5-diiodo-4-hydroxybenzaldehyde, 13.6 g. of phenylacetic acid, 10 g. (.1 mol) of anhydrous triethylamine and 100 cc. of acetic anhydride is heated for 10-15 hours at 110-115°. The reaction mixture, after cooling to about 60°, is poured into water and the crude condensation product worked up in accordance with the directions of Example 3. In place of triethylamine one can use quite satisfactorily anhydrous potassium acetate. With this substance, a reaction time of five hours at a temperature of 140° is preferable.

EXAMPLE 4

*α-(Phenyl)-2,4,6-triiodo-3-hydroxycinnamic acid*

5 g. of 2,4,6-triiodo-3-hydroxybenzaldehyde and 2.5 g. of anhydrous potassium phenylacetate dissolved in acetic anhydride are heated until condensation takes place in the manner above described. The reaction mixture is worked up in the usual manner and the α-(phenyl)-2,4,6-triiodo-3-hydroxycinnamic acid is obtained as a pale yellow crystalline material melting at about 226-228° C. with decomposition. It has the formula

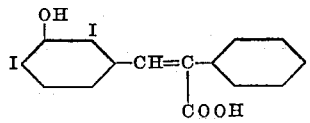

EXAMPLE 5

*α-(3,5-diiodo-4-hydroxyphenyl) cinnamic acid*

To 7.7 g. of p-hydroxyphenylacetic acid in 320 cc. of 0.5 N sodium hydroxide is added with stirring a solution of 20.3 g. of I₂ and 20.3 g. of KI in 100 cc. of water. After the addition is complete, the stirring is continued for fifteen minutes, the mixture filtered, and excess iodine is destroyed by the addition of sodium bisulphite. The solution is then acidified to Congo red paper with HCl and filtered. A crude yield of 14 g. is obtained with a melting point of 180-184° C. Upon recrystallization from dilute acetone the melting point rises to 217.5-219.5° C. (corr.).

To 6.7 g. of the sodium salt prepared from the 3,5-diiodo-4-hydroxyphenylacetic acid so obtained there is added 1.8 g. of benzaldehyde and 30 cc. of acetic anhydride. The mixture is heated for about four hours at about 110° C. and is then poured into water, filtered, and the residue dissolved in ether. The ether solution is extracted with 10% potassium carbonate solution, the extract acidified, and the precipitate filtered. Upon recrystallization from acetone-water, 4.1 g. of a product melting at 200-210° C. is obtained. Upon recrystallization from methylene chloride-petroleum ether, pale yellow needles are obtained which melt at approximately 216-218° C. with decomposition.

Similar results are obtained by employing potassium 3,5-diiodo-4-hydroxyphenylacetate in place of the sodium compound.

The compound has the formula

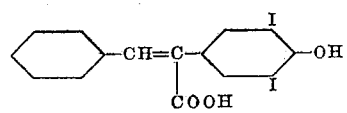

EXAMPLE 6

*α-(3,5-diiodo-4-hydroxyphenyl)-3,5-diiodo-4-hydroxycinnamic acid*

3,5-diiodo-4-hydroxybenzaldehyde and anhydrous potassium 3,5-diiodo-4-hydroxyphenylacetate are condensed as above described in the presence of acetic anhydride. On working up the reaction product, the tetra-iodo diphenyl alkene carboxylic acid is obtained as a pale yellow crystalline solid melting at about 242-244° C. with decomposition.

The compound has the formula

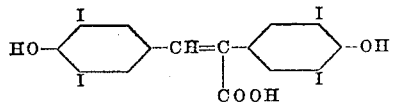

EXAMPLE 7

*α-Phenyl-2,4-diiodo-5-hydroxycinnamic acid*

In corresponding fashion, 2,4-diiodo-5-hydroxybenzaldehyde and phenylacetic acid potassium salt on condensation yields α-phenyl-2,4-diiodo-5-hydroxycinnamic acid of the formula

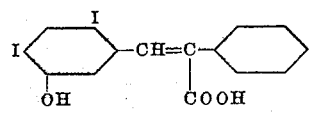

EXAMPLE 8

*α-Phenyl-3-chloro-4-hydroxycinnamic acid*

A mixture of one mole of anhydrous potassium phenyl-acetate, one mole of 3-chloro-4-hydroxybenzaldehyde and three moles of acetic anhydride is heated with stirring at 105-110° C. for four to six hours. After cooling the reaction mixture to approximately 75° C., the acetic anhydride is decomposed cautiously with water and the resulting mixture poured into two liters of 5% hydrochloric acid. After standing overnight, the aqueous layer is decanted and the semi-solid cake is dissolved with heat in dilute sodium carbonate solution. The alkaline solution is treated with charcoal, filtered and acidified. The substituted cinnamic acid is obtained in good yield; and, after recrystallization from dilute ethyl alcohol, melts at 181–182° C.

EXAMPLE 9

α-Phenyl-3,5-dichloro-4-hydroxycinnamic acid

The condensation of anhydrous potassium phenylacetate and 3,5-dichloro-4-hydroxybenzaldehyde is carried out essentially as described in the preceding example. The dichloro acid melts at 244–244.5° C. after recrystallization from a mixture of ethyl alcohol and water.

EXAMPLE 10

α-(p-Iodophenyl)-3,5-dichloro-4-hydroxycinnamic acid

This substituted acid is obtained from anhydrous potassium p-iodophenylacetate and 3,5-dichloro-4-hydroxybenzaldehyde in accordance with the procedure of the preceding examples. It is a white, crystalline solid melting at 231–232° C. after recrystallization from aqueous ethanol.

EXAMPLE 11

α-Phenyl-3,5-dibromo-4-hydroxycinnamic acid

The condensation of anhydrous potassium phenylacetate and 3,5-dibromo-4-hydroxybenzaldehyde in acetic anhydride in accordance with the procedure of the preceding examples gives the dibromocinnamic acid melting at 216–218° C. after recrystallization from aqueous ethanol.

EXAMPLE 12

α-(p-Iodophenyl)-3,5-dibromo-4-hydroxycinnamic acid

By substituting 3,5-dibromo-4-hydroxybenzaldehyde for the dichloro compound of Example 10, this cinnamic acid is obtained as a white solid crystallizable from aqueous ethanol and melting at 250–252° C.

EXAMPLE 13

α-Phenyl-3,5-dibromo-2-hydroxycinnamic acid

Anhydrous potassium phenylacetate is condensed with 3,5-dibromo-2-hydroxybenzaldehyde in acetic anhydride as described for the 4-hydroxy isomer. After recrystallization from aqueous alcohol, the compound melts at 186–188° C.

The aliphatic or aromatic carboxylic acid may be used in the form of either the anhydrous sodium or potassium salts. Condensation can also be carried out by using the free aliphatic or aromatic carboxylic acid with an appropriate catalyst such as triethylamine or potassium acetate; these catalysts being used in mole ratio. A typical condensation with the free acid is as follows: A mixture of 136 g. (1 mole) of phenylacetic acid, 190 g. (1 mole) of 3,5-dichloro-4-hydroxybenzaldehyde, 306 g. (3 moles) of acetic anhydride and 98 g. (1 mole) of anhydrous potassium acetate are heated with stirring at 135–140° C. for five hours. The reaction mixture is then worked up as described in the preceding examples and a good yield of the α-phenyl-3,5-dichloro-4-hydroxycinnamic acid is obtained.

In place of potassium acetate, triethylamine can be used with the following changes in the reaction conditions: A reaction temperature of 110–115° C. for approximately twenty hours gives good yields of the condensation product.

EXAMPLE 14

α-(p-Aminophenyl)3,5-diiodo-4-hydroxycinnamic acid

One mole of p-aminophenylacetic acid as the anhydrous potassium salt is condensed with one mole of 3,5-diiodo-4-hydroxybenzaldehyde in three moles of acetic anhydride. The reaction is carried out with stirring at 110° C. for approximately 4–6 hours. The crude condensation product is worked up as described in Example 8 except for the acidification which is made with acetic acid instead of the conventional mineral acids. Recrystallization from aqueous alcohol gives this amino acid as a pale yellow, crystalline substance melting at approximately 217–219° C.

EXAMPLE 15

α-Phenyl-3,5-diiodo-4-aminocinnamic acid

One mole of anhydrous potassium 3,5-diiodo-4-amino-phenylacetate is condensed with one mole of benzaldehyde and three moles of acetic anhydride in accordance with the instructions of Example 14. The diiodo amino acid so obtained is purified by recrystallization from aqueous alcohol.

The corresponding dibromo and dichloro compounds can be made using the dibromo- and dichloro-phenylacetic acids.

EXAMPLE 16

α-(p-Iodophenyl)-3-chloro-4-hydroxycinnamic acid

The reaction of anhydrous potassium p-iodophenylacetate and 3-chloro-4-hydroxybenzaldehyde may be carried out in accordance with the procedure of the preceding examples. The product is a white, crystalline solid after recrystallization from aqueous ethanol.

EXAMPLE 17

α-(p-Chlorophenyl)-3,5-dibromo-4-hydroxycinnamic acid

By substituting anhydrous potassium p-chlorophenylacetate for the corresponding iodo compound in Example 12, the compound of this example is obtained as a pale yellow, crystalline solid recrystallized from aqueous ethanol melting at about 223–226° C. with partial decomposition.

EXAMPLE 18

α-Benzyl-3-chloro-4-hydroxycinnamic acid

The condensation of anhydrous potassium β-phenyl-propionate and 3-chloro-4-hydroxybenzaldehyde in accordance with the instructions of Example 2 yields the mono-chloro acid of this example which may be recrystallized from a mixture of acetone and water. It melts at about 215–220° C.

EXAMPLE 19

α-Benzyl-3,5-dibromo-4-hydroxycinnamic acid

By condensing equimolecular amounts of anhydrous potassium β-phenylpropionate and 3,5-dibromo-4-hydroxybenzaldehyde as described in Example 2, the benzyldibromocinnamic acid of this example is obtained as a white, crystalline solid melting at 218–224° C. It may be recrystallized from a mixture of acetone and water and then melts at 230–232° C.

EXAMPLE 20

*α-Phenyl-2-hydroxy-5-bromocinnamic acid*

The condensation of anhydrous potassium phenylacetate and 5-bromosalicylaldehyde may be carried out in accordance with the methods described in the preceding example. The crude condensation product melts at approximately 150–160° C. and after recrystallization from a mixture of acetone and water it is obtained as a pale yellow, crystalline solid melting at 168–170° C.

EXAMPLE 21

*α-(p-Iodophenyl)-2-hydroxy-5-bromocinnamic acid*

By substituting anhydrous potassium p-iodophenylacetate for the phenylacetate in the preceding example, the iodo bromo compound of this example is obtained as a white, crystalline solid after recrystallization from aqueous ethanol.

EXAMPLE 22

*α-(1-naphthyl)-2,4,6-triiodo-3-hydroxycinnamic acid*

0.03 mole of potassium α-naphthalene acetate and 0.03 mole of 2,4,6-triiodo-3-hydroxybenzaldehyde in 80 cc. of acetic anhydride are condensed as described in Example 1. The reaction mixture is worked up by the ether sodium extraction method and the substituted cinnamic acid obtained melts at 209–211° C. Recrystallized from acetone-water mixture, the product is obtained in the form of a pale yellow material melting at about 212–214° with decomposition. It has the formula

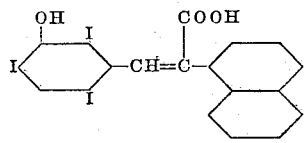

EXAMPLE 23

*α-(1-naphthyl)-3,5-diiodo-4-hydroxycinnamic acid*

This product is obtained by using 3,5-diiodo-4-hydroxybenzaldehyde with the potassium salt of α-naphthalene acetic acid. The isolation of the compound and its purification are carried out as described in Example 1. The substituted diiodo acid is obtained as a pale yellow powder which after recrystallization from acetone and water melts at about 234–235° C. with decomposition. It has the formula

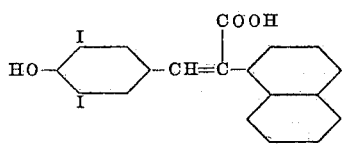

In the starting compounds, the hydroxyl group or groups can be functionally substituted, as by alkoxy or acyloxy groups, preferably of lower molecular weight, such as methoxy, ethoxy, acetoxy, and propionoxy groups, which may, if desired, be converted to hydroxyl in the final product by hydrolysis.

The various metal, amine and alkanolamine salts of the compounds of the invention are, in general, more soluble than the corresponding free acids and may be prepared in the usual manner.

The compounds of the invention are useful in the treatment of amebiasis. They are not only effective amebicides but they also have an effective bactericidal action thus reducing or eliminating the secondary bacterial infections frequently associated with amebiasis. They have a very low toxicity, and in particular the stability of the iodine in the iodine compounds of the invention eliminates the occurrence of iodinism when they are administered orally.

The compounds of the invention are also suitable for use as contrast agents in X-ray diagnosis, particularly of the liver and gall bladder.

This application is a continuation-in-part of our application Ser. No. 530,184, filed April 8, 1944, now abandoned, and contains subject matter in common with our applications Ser. No. 699,594, filed September 26, 1946, and Ser. No. 787,852, filed November 24, 1947, both abandoned.

We claim:

1. α-(Phenyl)-3,5-diiodo-4-hydroxycinnamic acid.

2. α-Phenyl-3,5-dichloro-4-hydroxycinnamic acid.

3. α-Phenyl-3,5-dibromo-4-hydroxycinnamic acid.

4. Chemotherapeutic compounds of the formula

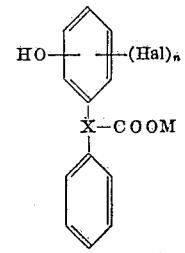

wherein X is an unsaturated aliphatic hydrocarbon radical containing not less than 2 and not more than 3 carbon atoms, the phenyl rings being attached to different carbon atoms of the aliphatic radical X, and Hal is a halogen having an atomic number not less than 17 and not greater than 53, n is an integer not less than 2 and not greater than 3, the halogens being only in the ortho and para positions to the hydroxyl group, and M is a non-toxic cation.

5. Compounds as defined in claim 4 wherein the halogens are iodine.

6. Compounds as claimed in claim 4 wherein the halogens are bromine.

7. Compounds as defined in claim 4 wherein the halogens are chlorine.

8. Compounds as defined in claim 4 wherein the hydroxyl is in the 4-position, n is 2, and the halogens are in the 3- and 5-positions.

9. α-Benzyl-3,5-diiodo-4-hydroxycinnamic acid.

10. α-Phenyl-2,4,6-triiodo-3-hydroxycinnamic acid.

11. The sodium salt of α-(phenyl)-3,5-diiodo-4-hydroxycinnamic acid.

12. A compound of the formula

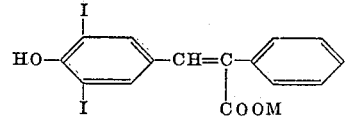

wherein M is a non-toxic cation.

DOMENICK PAPA.
ERWIN SCHWENK.

(References on following page)

References Cited in the file of this patent

UNITED STATES PATENTS

| Number | Name | Date |
|---|---|---|
| 2,345,384 | Dohrn et al. | Mar. 28, 1944 |
| 2,400,433 | Natelson et al. | May 14, 1946 |

OTHER REFERENCES

Shoppee, J. Chem. Soc. (London), vol. 1930, pp. 968–985.

Bistrzycki et al., Ber. Deut. Chem., vol. 41, pp. 1666 (1908).

Stoermer et al., Ber. Deut. Chem., vol. 44, pp. 1845, 1852 (1911).

Kogel et al., Liebig's Annalen der Chem., vol. 465, pp. 211–242 (1928).

Wheeler et al., Am. Chem. Jour., vol. 43, pp. 11–19 (1910).

Chakravarti et al., Chemical Abstracts, vol. 39, col. 1400–1401 (1945).

Lewis et al., Chemical Abstracts, vol. 34, col. 5078 (1940).

Faltis et al., Chemical Abstracts, vol. 26, p. 5304 (1932).

Adams et al., "Organic Reactions," vol. 1, pp. 211, 236–240, 246–7 (1942).

Lampe et al., Sardo, Beilstein (4th ed., 1927), vol. 10, p. 346.

Mayer et al, Beilstein (4th ed., suppl., 1932), vol. 10, p. 160.